United States Patent [19]

Ulber

[11] Patent Number: 4,819,851

[45] Date of Patent: Apr. 11, 1989

[54] ARRANGEMENT FOR FIXING THE CAPSTAN OF A MAGNETIC TAPE RECORDER MEANS

[75] Inventor: Armin Ulber, Karlsfeld, Fed. Rep. of Germany

[73] Assignee: Siemens Aktiengesellschaft, Berlin and Munich, Fed. Rep. of Germany

[21] Appl. No.: 66,215

[22] Filed: Jun. 25, 1987

[30] Foreign Application Priority Data

Aug. 5, 1986 [DE] Fed. Rep. of Germany ....... 3626518

[51] Int. Cl.⁴ .......................... B65H 20/02; F16B 2/00
[52] U.S. Cl. ....................................... 226/194; 403/370
[58] Field of Search ...................... 226/190, 193, 194; 403/370, 371, 372; 285/340

[56] References Cited

U.S. PATENT DOCUMENTS

| | | | |
|---|---|---|---|
| 2,549,665 | 4/1951 | Conrad | 403/370 X |
| 2,650,867 | 9/1953 | Speith | 403/370 X |
| 2,798,748 | 7/1957 | Maurer | 403/372 |
| 3,009,747 | 11/1961 | Pitzer | 403/371 X |
| 3,097,778 | 7/1963 | Pendleton | 226/95 |
| 3,251,048 | 5/1966 | Killen | 226/95 X |
| 3,319,748 | 5/1967 | Joyce, Jr. | 226/188 X |
| 3,357,631 | 11/1970 | Fujii | 206/609 |
| 3,890,641 | 6/1975 | Mo et al. | 226/95 X |
| 3,930,603 | 1/1976 | Grant | 226/95 X |
| 4,065,044 | 12/1977 | Painter | 226/188 |

FOREIGN PATENT DOCUMENTS

| | | | |
|---|---|---|---|
| 520755 | 2/1929 | Fed. Rep. of Germany | 285/340 |
| 427591 | 11/1947 | Italy | 403/370 |
| 1195723 | 6/1970 | United Kingdom | 285/340 |

OTHER PUBLICATIONS

IBM Technical Disclosure Bulletin, vol. 4, No. 3, Aug., 1961.
IBM Technical Disclosure Bulletin, vol. 16, No. 1, Jun., 1973.
IBM Technical Disclosure Bulletin, vol. 16, No. 10, Mar., 1974.

Primary Examiner—Joseph J. Hail, III
Attorney, Agent, or Firm—Hill, Van Santen, Steadman & Simpson

[57] ABSTRACT

For the purpose of fixing a capstan fashioned in light weight structure as a hollow cylinder having a perforated generated surface on the shaft stub of a drive motor for a magnetic tape recorder means, the shaft stub being composed of a ceramic material, the capstan has a bearing sleeve. At its end at the motor side, this bearing sleeve forms a guide ring which is narrowly toleranced with respect to the outside diameter of the shaft stub; at its opposite, outer end, it includes a threaded bore for the acceptance of a tensioning nut having an outside thread; and, in the transition region from the guide ring to the threaded bore, it has a tensing or clamping lip which wedges against the shaft stub in rotational-symmetrical fashion when the capstan is mounted on the shaft stub, deforming under the pressure of the tensioning nut.

5 Claims, 2 Drawing Sheets

ARRANGEMENT FOR FIXING THE CAPSTAN OF A MAGNETIC TAPE RECORDER MEANS

BACKGROUND OF THE INVENTION

1. Field of the Invention

The invention is directed to an arrangement for fixing or securing the capstan on the shaft stub of a drive motor for a magnetic tape recorder means wherein this shaft stub is composed of a ceramic material.

2. Description of the Prior Art

In commercial magnetic tape recorder means which are utilized as digital stores in data-processing systems, the magnetic tape is frequently transported by only a single capstan. Take-up reel and take-off reel have drives which are separate therefrom and which are controlled via the loop length of the tape section buffered in buffer chambers. These magnetic tape recorder means are utilized in start/stop operation, the binary data are stored or, respectively, read out formated in blocks, and short interblock gaps of only a few millimeters are left between the blocks for reasons of storage capacity. At the same time, the tape speed in fast-running magnetic tape recorder means amounts, for example, to 200 ips, this corresponding to a tape speed of more than 5 m/s in the metric system.

It can be seen without further ado from these boundary conditions that extremely high demands are made of the drive system for the magnetic tape, this being composed of tape drive motor, capstan and of a tape speed control. The capstan seated on the shaft stub of a tape drive motor is therefore executed in lightweight fashion because of the mass moment of inertia and is essentially composed of a thin-walled, cylindrical cage in whose generated surface a plurality of passages are provided and which comprises a bearing sleeve in axial direction for the acceptance of the shaft stub of the tape drive motor. A light metal alloy, frequently a magnesium-aluminum alloy, is used for manufacturing this cage. Likewise in adaptation to these boundary conditions, a sintered material is utilized as the material for the motor shaft of the tape drive motor, this, given lowest weight, exhibiting great stiffness in comparison to other materials usually employed. This sintered material is preferably composed of an aluminum oxide ceramic. On the basis of this material, one succeeds in displacing torsional vibrations of the motor shaft into a frequency range which is uncritical for the control system of the tape drive.

However, this material selection has certain disadvantages, because the coefficients of thermal expansion of the materials for the capstan or, respectively, the motor shaft differ extremely. Difficulties in fixing or securing the capstan to the shaft stub of the tape drive motor result therefrom. Moreover, the ceramic material employed for the manufacture of the motor shaft is critical in terms of production engineering; one therefore attempts to suppress modifications in the diameter in the case of the motor shaft insofar as possible.

This structural principle then also has effects on the type of fastening the capstan to the shaft stub. Usually, a strike sleeve is slipped onto the shaft stub of uniform diameter and is glued to the shaft stub. A strike face against which the capstan is pushed during assembly is thus formed. The guide bore in the bearing sleeve of the capstan is toleranced with tight play in comparison to the outside diameter of the shaft stub and is therefore seated with precise fit. The capstan is fixed with a fastening screw which is screwed into the head end of the shaft stub in axial direction and which axially tenses the bearing sleeve of the capstan. The fastening screw is thereby seated in a threaded bush which is centrally let into the head of the shaft stub.

This conventional solution is definitely uncritical given normal operation of the magnetic tape recorder means. However, experience has shown that the pairing of materials can nonetheless lead to sporadic outages. Investigations of the outages have shown that these are to be attributed to ungovernable temperature influences during shipment from the manufacture to the place the apparatus is utilized. Temperatures that are far higher than usually found, for example, in a computer center or, respectively, than are reached during operation of the magnetic tape recorder means under normal conditions can be encountered on this shipment route. Given adequately high temperatures, such high axial forces already arise due to the different coefficients of thermal expansion of the materials for the motor shaft and for the bearing sleeve of the capstan that the glued location between strike sleeve and shaft stub yields and the strike sleeve yields slightly axially. Under normal operating conditions, the axial retaining forces for the capstan are no longer adequate for a faultless, slip-free running.

Also added thereto is that the reduced pressing power of the fastening screw promotes a loosening of this screw when the capstan runs in right-handed rotation. Damage to the tape drive can be the result.

SUMMARY OF THE INVENTION

It is therefore an object of the invention, giving particular consideration to the described boundary conditions with respect to the restriction in the materials selection and the determination of structural principles deriving therefrom, to create an arrangement of the type initially described above which is significantly less critical in view of temperature stresses than the known fastening of the capstan and which is thus also able to withstand unforeseeable or, respectively, ungovernable temperature influences.

In an arrangement of the type initially cited, this object is achieved by having the bearing sleeve comprising a guide ring at the motor side of the bearing sleeve, narrowly toleranced with respect to an outside diameter of the shaft stub, a threaded bore at its opposite outer end for the acceptance of a tensioning nut having outside thread, and a tensing or clamping lip in the transition region from the guide ring to the threaded bore, the tensing or clamping lip wedging against the shaft stub in rotational symmetrical fashion when the capstan is mounted on the shaft stub, deforming under the pressure of the tensioning nut.

In this solution, the tensing of the capstan in axial direction for the purpose of fixing it to the shaft stub of the drive motor is foregone. For this reason, dimensional changes of the bearing sleeve here relative to the shaft stub due to a formation of heat can no longer cause disturbances. In the inventive solution, by contrast, the capstan is held by tensing forces in radial direction. It is thereby a critical feature that the tensing lip is elastically tensed on the outside diameter of the shaft stub as a result of its geometrical design and of the material employed for the manufacture of the capstan. For example, this is expressed in the fact that the fastening arrangement of the invention is also releasable. On the other hand, this elastic tensing of the tensing or clamping lip also means that thermal expansions can thereby be intercepted without having irreversible damage occur.

Another significant feature of the solution of the invention is that it requires no modifications whatsoever in the materials pairings or in the structural embodiment of the shaft stub of the drive motor. In particular, turned-in portions, radial channels such as frequently employed in standard fastenings of drive elements to a motor shaft, are avoided in consideration of the special material properties of the motor shaft.

It is of critical significance for true running of the capstan that the tensing forces occur uniformly distributed over the circumference. This is assured in the solution of the invention in that the inside diameter of the guide bore and of the tensing or clamping lip are identical in their nonprestressed condition, i.e. they are manufactured in common in one chucking. When the tensioning nut is screwed on, the tensing or clamping lip therefore presses against the outside diameter of the shaft stub uniformly distributed over the circumference; the point of attack of the force thereby lies at the inside end of the tensing or clamping lip, i.e. close to the outside diameter of the shaft stub, so that a beneficial moment derives at the tensing or clamping lip.

As improvements of the invention show, the solution of the invention also allows the capstan to be mounted on the shaft stub with very simple means. The only thing required for that purpose are two different wrenches which attack at the outer collar or shoulder of the capstan or, respectively, at the tensioning nut. The solution of the invention is therefore simple and cost-beneficial both in manufacture as well as for assembly. It even allows one to manage without a threaded nut embedded into the head end of the shaft stub. This structural detail of the conventional fastening arrangement makes the manufacture of the motor shaft more expensive, unnecessarily as has now been shown.

BRIEF DESCRIPTION OF THE DRAWINGS

Other developments of the invention and further advantages may be derived from the following description of an exemplary embodiment provided with reference to the drawing. Thereby shown are.

DESCRIPTION OF THE PREFERRED EMBODIMENTS

Figure 1:
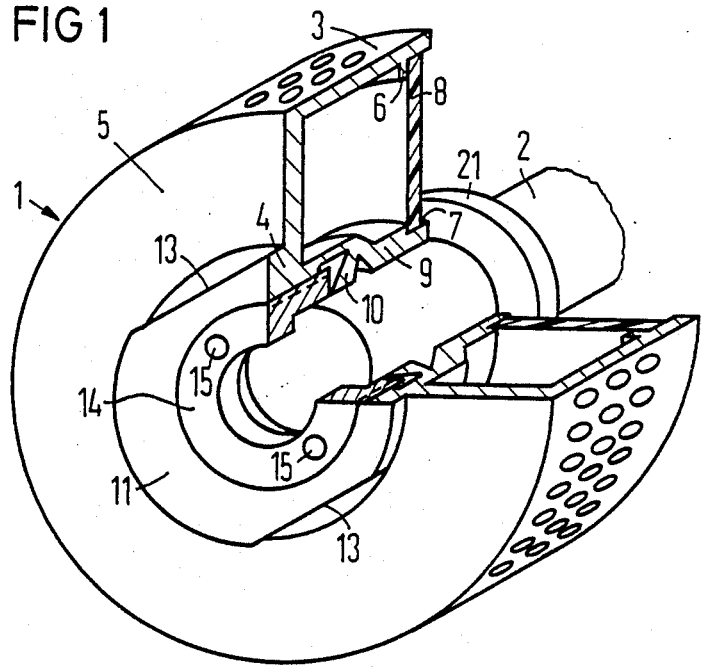
FIG. 1 is a three-dimensional, partially cut view of an example of an inventive arrangement for fixing a capstan on the shaft stub of drive motor of a magnetic tape recorder means.

FIG. 1 shows an arrangement for fixing a capstan 1 on a shaft stub 2 of a drive motor in a magnetic tape recorder means, this shaft stub 2 being composed of a ceramic material, for example of an aluminum oxide ceramic. The drive motor itself is not shown here since it is known in and of itself and does not constitute part of the invention. The shaft stub 2 is a cylindrical shank without any turned-in portions whatsoever and has absolutely no shoulders or projections. This structural detail takes the manufacturing method for the shaft of the drive motor into consideration, whereby the shaft shape is first defined in the as yet doughy consistency of the ceramic compound and wherein a hardening process subsequently ensues. The motor shaft is then extremely difficult to work in its hardened condition.

The basic shape of the capstan 1 is a cylindrical, hollow member having a perforated generated surface 3 and a central bearing sleeve 4. The capstan 1 thus comprises a U-shaped cross-section having legs arranged in the axial direction of the shaft stub 2, these legs being formed of the generated surface 3 or, respectively, of the bearing sleeve 4. These legs are connected by a thin front surface 5. The generated surface 3 and the bearing sleeve 4 each include projections 6 or, respectively, 7 at their ends facing away from the front surface 5, a thin disc of plastic 8 being clamped between these projections 6 and 7 as a backwall of the capstan 1.

That end of the bearing sleeve 4 at the motor side facing away from the front surface 5 is fashioned as guide ring 9 for the capstan 1 on the shaft stub 2 and, for this purpose, includes a guide that is narrowly toleranced with respect to the outside diameter of the shaft stub 2. Further, the bearing sleeve 4 includes a tensing or clamping lip 10 which is offset from the inside end of the guide ring 9 by a V-shaped incision. This tensing or clamping lip is executed thin-walled, is inclined relative to the axial direction of the shaft stub 2 by a clearance angle, and has an inside diameter which coincides with that of the guide ring 9 in the unstressed condition. The front end of the bearing sleeve 4, finally, forms a collar or shoulder 11 projecting from the front surface 5 having an inside thread 12 and two lead or slope surfaces 13 which proceeds parallel to one another.

The inside thread 12 of the bearing sleeve 4 serves the purpose of accepting a tensioning nut 14 having an outside thread corresponding to the inside thread 12, having an inside diameter with a clearance fit relative to the outside diameter of the shaft stub 2, and having a head part into which two bores 15 residing diametrically opposite one another are formed in the axial direction.

Figure 2:
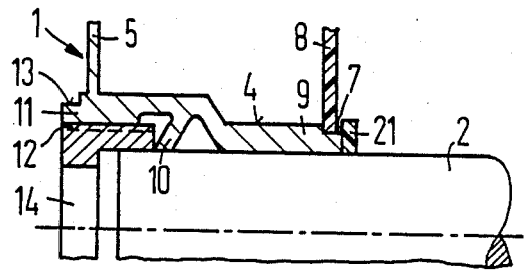
FIG. 2 is a half section of a side view of the embodiment of the bearing sleeve of the capstan for an arrangement of FIG. 1.

The manner of functioning of the arrangement set forth above can be most clearly understood from the half section of the arrangement of the capstan 1 on the shaft stub 2 shown in FIG. 2. A stop ring 21 is glued to the shaft stub 2 for fixing a defined axial position of the capstan 1 with reference to the shaft stub 2. Given a capstan 1 put in place on the shaft stub 2, the end face of the bearing sleeve 4 at the motor side lies against the stop ring 21 and the inner end face of the tensioning nut 14 lies against the tensing or clamping lip 10. As a result of the slope of the tensing or clamping lip 10 and of the sharp-edged fashioning of the end face of the tensioning nut 14, the point at which the force attacks lies close to the surface of the shaft stub 2. This point of attack is optimally offset from the low end of the tensing or clamping lip 10, i.e. from the transition in the generated surface of the bearing sleeve 4, so that a favorable moment derives.

Under the influence of the pressing power exerted by the tensioning nut 14, the tensing or clamping lip 10 deforms and is thereby diagonally braced relative to the surface of the shaft stub 2. As a result of this spreading effect of the tensioning or clamping lip, the capstan 1 is unambiguously but releasably fixed on the shaft stub, for the deformation of the tensioning or clamping lip 10 still lies in the elastic range.

Figure 3:
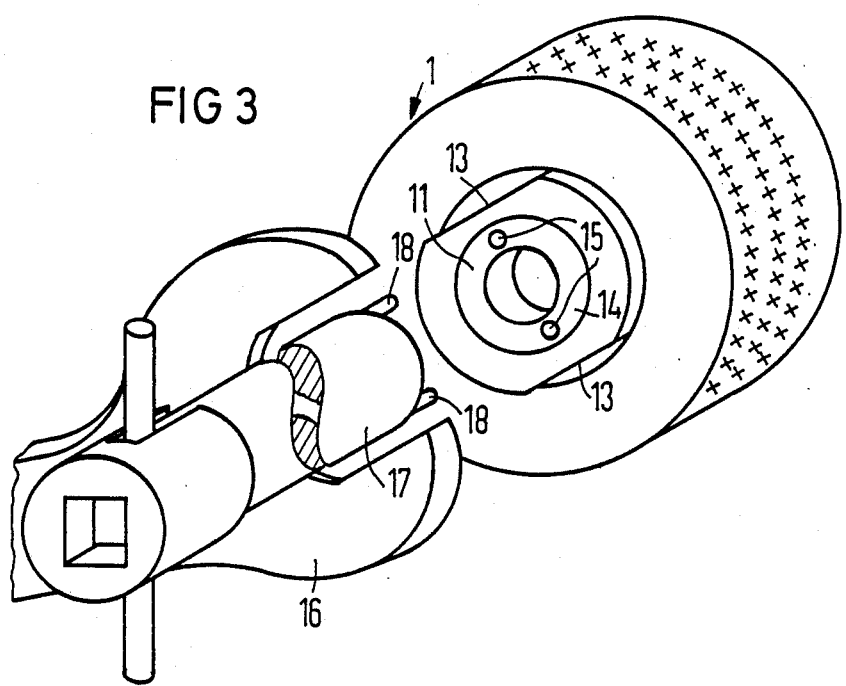
FIG. 3 is an exploded view of the capstan of an inventive arrangement together with the appertaining assembly tools.

FIG. 3 illustrates the assembly operation just explained above for the described arrangement, particularly in view of the tools thereby employed. The cut or slope faces 13 of the collar or shoulder 11 of the capstan 1 proceeding parallel to one another serve the purpose of putting an open end wrench 16 in place. The counter-force for screwing the tensioning nut 14 is exerted by a socket wrench 17 which includes two arbors 18 as counterparts to the bores 15 in the tensioning nut 14. The socket wrench 17 is preferably fashioned as a torque wrench so that the forces the tensioning nut 14 transmits onto the tensioning or clamping lip 10 are upwardly limited, so that an over-turning of the tensioning or clamping lip 10 is avoided.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. An arrangement for fixing a capstan to the shaft stub of a drive motor in a magnetic tape recorder means, said shaft stub being composed of a ceramic material, wherein the capstan is fashioned in light weight structure as a hollow cylinder having a perforated generated surface and comprises a bearing sleeve formed as an annular wall for the acceptance of the shaft stub, wherein at an end of said bearing sleeve at the motor side, said bearing sleeve comprises a guide ring narrowly toleranced with respect to an outside diameter of the shaft stub, comprises a threaded bore at its opposite outer end for the acceptance of a tensioning nut having outside thread, and comprises only a single, thin-walled, integral and annular tensing or clamping lip in a transition region between the guide ring and the threaded bore, being offset from an inside end of the guide ring by a V-shaped incision and being inclined relative to the axial direction of the shaft stub, this tensing or clamping lip having an uninterrupted circular inner circumference wedging against the shaft stub in rotational-symmetrical fashion when the capstan is mounted on the shaft stub, deforming under the compressive pressure of the tensioning nut and as a result of the inclination of the tensing or clamping lip, the point at which the tensioning nut engages the lip lies close to the surface of the shaft stub.

2. An arrangement according to claim 1, wherein the finished dimensions of the inside diameter of the guide ring and of the tensing or clamping lip are identical in their unstressed condition.

3. An arrangement according to claim 1, wherein the inside diameter of the tensioning nut is toleranced as a clearance fit with respect to the outside diameter of the shaft stub.

4. An arrangement according to claim 1, wherein the bearing sleeve comprises a salient collar or shoulder at its outer end, this collar or shoulder being fashioned as a head for the application of an assembly tool and in that the tensioning nut is fashioned as a threaded ring whose end facing away from the tension of clamping lip comprises a counter-profile for the application of a further assembly tool.

5. An arrangement according to claim 4, wherein the collar or shoulder of the bearing sleeve comprises two cut or slope surfaces residing diametrically opposite one another for the application of an open-end wrench and in that two bores for the application of a socket wrench are provided in the head end of the tensioning nut, said bores proceeding in axial direction.

* * * * *